(12) United States Patent
Dutta

(10) Patent No.: US 6,684,238 B1
(45) Date of Patent: Jan. 27, 2004

(54) METHOD, SYSTEM, AND PROGRAM FOR WARNING AN EMAIL MESSAGE SENDER THAT THE INTENDED RECIPIENT'S MAILBOX IS UNATTENDED

(75) Inventor: Rabindranath Dutta, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/553,808

(22) Filed: Apr. 21, 2000

(51) Int. Cl.⁷ .................................... G06F 15/16
(52) U.S. Cl. ................. 709/206; 709/203; 709/207
(58) Field of Search ............................... 709/203, 204, 709/205, 206, 207, 208, 245; 706/47

(56) References Cited

U.S. PATENT DOCUMENTS

| | | | |
|---|---|---|---|
| 5,802,253 A | * 9/1998 | Gross et al. | 709/206 |
| 6,301,609 B1 | * 10/2001 | Aravamudan et al. | 709/207 |
| 6,411,947 B1 | * 6/2002 | Rice et al. | 706/47 |
| 6,415,318 B1 | * 7/2002 | Aggarwal et al. | 709/206 |
| 6,430,604 B1 | * 8/2002 | Ogle et al. | 709/207 |
| 6,484,196 B1 | * 11/2002 | Maurille | 709/206 |
| 6,496,851 B1 | * 12/2002 | Morris et al. | 709/204 |

OTHER PUBLICATIONS

Paul Henry, Hui Luo, Off–the–record Email System, 2001, IEEE INFOCOM, pp. 869–877.*
Al–Hammadi et al., Certified Exchange of Electronic Mail (CEEM), 1999, IEEE, pp. 40–43.*

* cited by examiner

Primary Examiner—Joseph H. Feild
Assistant Examiner—Chau Nguyen
(74) Attorney, Agent, or Firm—Marilyn Smith Dawkins; Bracewell & Patterson, L.L.P.

(57) ABSTRACT

A system, method, and program are disclosed for warning an email message sender that the intended recipient's mailbox is unattended. An indication of an intended recipient from within a designated form for an email message is received from a sender desiring to send the email message prior to receiving an indication to send the email message. A determination is then made, in response to the received indication, whether a mailbox for the intended recipient is designated as being currently unattended. The sender is informed, prior to receiving the indication to send the email message, if the mailbox for the intended recipient is designated as being currently unattended.

25 Claims, 4 Drawing Sheets

METHOD, SYSTEM, AND PROGRAM FOR WARNING AN EMAIL MESSAGE SENDER THAT THE INTENDED RECIPIENT'S MAILBOX IS UNATTENDED

BACKGROUND OF THE INVENTION

1. Technical Field

The present invention relates in general to data processing systems and, in particular, to a data processing system, method, and program including electronic mail systems for transmitting messages. Still more particularly, the present invention relates to a data processing system, method, and program including electronic mail systems for informing an email message sender, prior to the sender transmitting the message, that the intended recipient's mailbox is unattended.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, and Aptiva series.

Computer systems may be coupled together in a network, either a local, regional Intranet or through a wider, more global Internet. Users of these computer systems typically have the ability to transmit electronic mail (email) messages to each other utilizing these networks. Coordinating the transmission of electronic mail is typically handled utilizing a mail server. Within the mail server, an electronic mail server program will maintain an address book including all possible recipients of email that connect to the mail server periodically to retrieve email. The mail server will also coordinate the receipt and delivery of electronic mail.

A variety of computer systems may be utilized to access electronic mail systems. These computer systems include personal computers, handheld computer systems, cellular telephones, and special purpose email client computer systems.

One problem with known email systems is the requirement that a user must first completely enter the content of an email message, and then mail the email message without knowing whether or not the intended recipient is unavailable for an extended period of time. An extended period may be for as little as one or two business days, or could be as long as several weeks or more. If a user is unavailable for an extended period of time, the email address will be unattended. In contrast, when a person calls another utilizing the telephone, the caller knows immediately upon the answering service answering the telephone that the intended recipient is not immediately available to receive a telephone call. This may save valuable time for the caller who now may not want to leave a detailed message.

In one known email system, a user may designate the user's mailbox as being "away". Thereafter, when the mail server for the user receives mail for that user, the mail server will then notify the sender that the user has designated their mailbox as being "away". In the prior art email system, a sender must first compose the entire message including the body of the message, and then transmit the message to the intended recipient before the sender will be notified that the intended recipient is "away".

SUMMARY OF THE INVENTION

A system, method, and program are disclosed for warning an email message sender that the intended recipient's mailbox is unattended. An indication of an intended recipient from within a designated form for an email message is received from a sender desiring to send the email message prior to receiving an indication to send the email message. A determination is then made, in response to the received indication, whether a mailbox for the intended recipient is designated as being currently unattended. The sender is informed, prior to receiving the indication to send the email message, if the mailbox for the intended recipient is designated as being currently unattended.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

The present invention is a method, system, and program for warning a sender of an email message, prior to the sender entering the content of the message, that a mailbox for an intended recipient of the message is currently unattended. An intended recipient of the message is selected. If the intended recipient is going to be away from the office, and not accessing or responding to email messages, the recipient will designate the recipient's mailbox as being unattended. A determination is made regarding whether the mailbox for the intended recipient is designated as being currently unattended. This determination is made substantially immediately upon the selection of the intended recipient and prior to the sender entering the content of the body of the message.

The sender will select or type in an intended recipient's name in a header portion of an email form for the email message. Upon entering a carriage return after selecting or typing the intended recipient's name, the sender's mail server will transmit a query to the recipient's mail computer server. The recipient's mail server will then check its address book for the intended recipient's mailbox address. If the mailbox has been designated as being currently unattended, the mail server will transmit a warning to the sender's mail server. The sender's mail server will transmit the warning to the sender's computer which will then display the message. The sender may then either choose to complete the message, or abandon it. In this manner, the sender need not waste time composing the main body of an email message to an intended recipient who will not be available to access the message.

Figure 1:
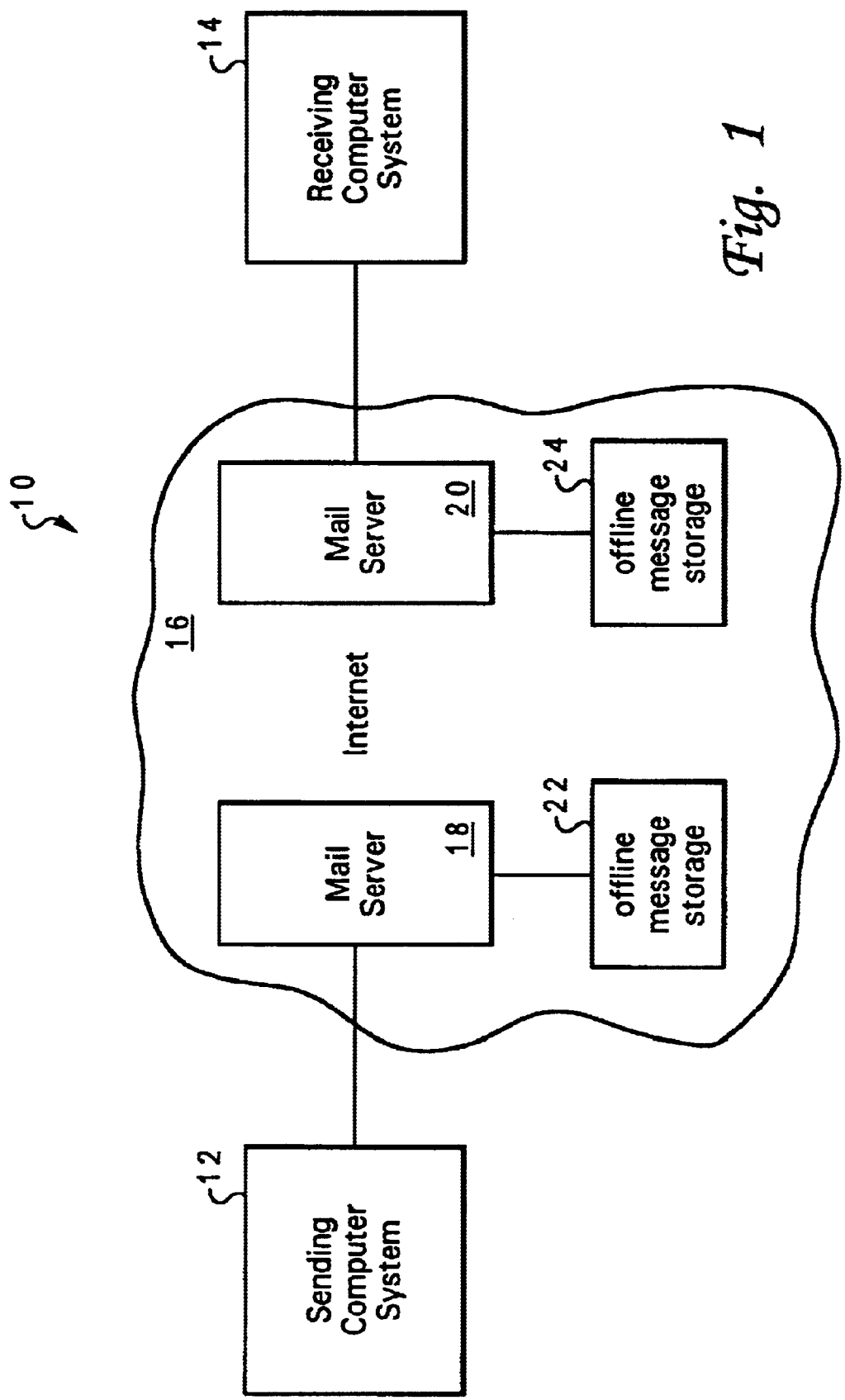
FIG. 1 depicts an illustrative embodiment of a data processing system with which the present invention may advantageously be utilized.

FIG. 1 illustrates a pictorial representation of a network 10 of data processing systems in accordance with the present invention. Network system 10 includes a sending computer system 12, a receiving computer system 14, and a network coupling sending computer system 12 to receiving computer system 14, such as Internet 16. Computer systems 12, 14 may be implemented utilizing any commercially available computer system which has been suitably programmed and which has been modified as described below.

Sending computer system 12 is coupled to a mail server 18, which is coupled to an offline message storage device 22. Receiving computer system 14 is coupled to a mail server 20 which is coupled to an offline message storage device 24. Mail server 18 is responsible for processing email for computer system 12. Mail server 20 is responsible for processing email for computer system 14. Mail server 18 may communicate with mail server 20 (directly or indirectly via a succession of intermediate servers) in order to transmit messages, such as email messages, or other information. Those skilled in the art will recognize that mail servers 18 and 20 may be implemented using the same computer system. Further, those skilled in the art will recognize that mail servers 18 and 20 may be implemented utilizing a single mail server such that they are the same mail server.

When a sender of a message utilizing computer system 12 wishes to transmit an electronic mail message to a recipient who is utilizing computer system 14, the sender may first retrieve an electronic mail message form to complete. The email form may be retrieved from mail server 18. The sender must then select an intended recipient or recipients, either by typing the name of the recipient into the form or by selecting the recipient's name from a listing of possible recipients. Once the sender has selected a recipient, upon the entry of an input event, mail server 18 will transmit a query to mail server 20 which is responsible for processing this intended recipient's mail. An input event may be the entry of a carriage return, a tab key entry, a mouse click, an enter key entry, or any other type of input a computer system is capable of receiving. Mail server 20 will then use its address book to determine whether this recipient's mailbox is designated as being unattended. If this recipient's mailbox is designated as being unattended, mail server 20 will transmit a warning to mail server 18 which will then transmit the warning to sending computer system 12. If the recipient's mailbox is not designated as being unattended, no transmission will occur from mail server 20.

The sender may then select to either continue with or abandon this email message. If the sender chooses to continue with the email message, the sender will complete the writing of the message. Once completed, the message will be transmitted from computer system 12 to mail server 18. Mail server 18 will then transmit the message to the recipient's mail server 20. Mail server 20 then holds the message, such as in offline message storage 24, until the recipient is ready to access the message.

Those skilled in the art will recognize that the present invention will operate in a similar manner when a group mail message is sent. For group mail messages, several intended recipients are selected. Upon a selection of each intended recipient, a query is transmitted from mail server 18 to the mail server responsible for processing the recipient's mail. If that recipient's mailbox is unattended, a warning is transmitted back to mail server 18. Therefore, for a group mail message where several recipient's are away, the sender will receive several different warnings, a different one for each recipient who is away.

Those skilled in the art will also recognize that the present invention is applicable to messages which are forwarded. The sender may receive a message which should be forwarded to one or more recipients. In this case, when the sender selects a recipient to receive the forwarded message, a warning is transmitted if the recipient is away.

In a different embodiment, one mail server is utilized. In this embodiment, the mail server is responsible for processing mail for both the recipient and sender.

Figure 2:
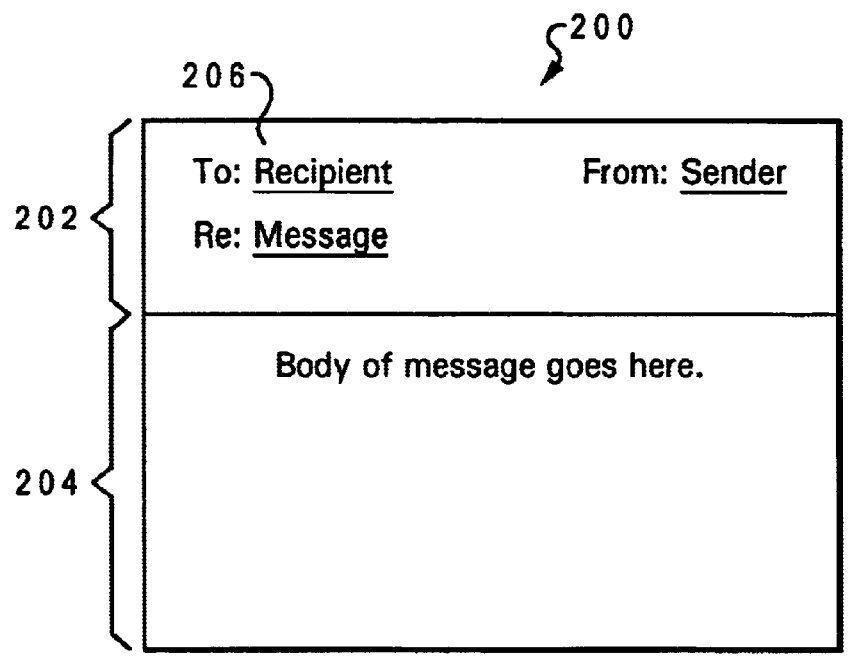
FIG. 2 illustrates an electronic mail message including a header and a body of the message in accordance with the present invention.

FIG. 2 illustrates an electronic mail message including a header and a body of the message in accordance with the present invention. Email message 200 includes a header 202 and a body 204 of message 200. Header 202 includes a field 206 for selecting an intended recipient, a field for identifying a sender, and a field for labeling the message. Body 204 of message 200 includes the main content of the message.

Figure 3:
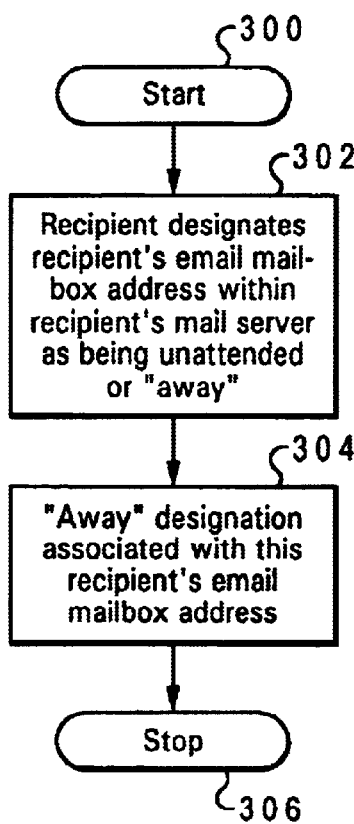
FIG. 3 depicts a high level flow chart which illustrates the designation of a user's electronic address as being unattended in accordance with the present invention.

FIG. 3 depicts a high level flow chart which illustrates the designation of a user's electronic address as being unattended in accordance with the present invention. The process starts as depicted by block 300 and thereafter passes to block 302 which illustrates a recipient designating the recipient's email mailbox address within the recipient's mail server 20 as being unattended, or "away".

An electronic mailbox, or mailbox address, is a file associated with a user for receiving electronic mail for the user. A user designates the user's electronic mailbox address as being unattended when the user will be on vacation or out of the office, and will not be accessing the mailbox to view and/or read messages. The user's electronic mailbox address will be unattended while the address has been associated with the "away" designation. The process then passes to block 304 which depicts the "away" designation being associated with this user's electronic mailbox address. The process then terminates as illustrated by block 306.

Figure 4:
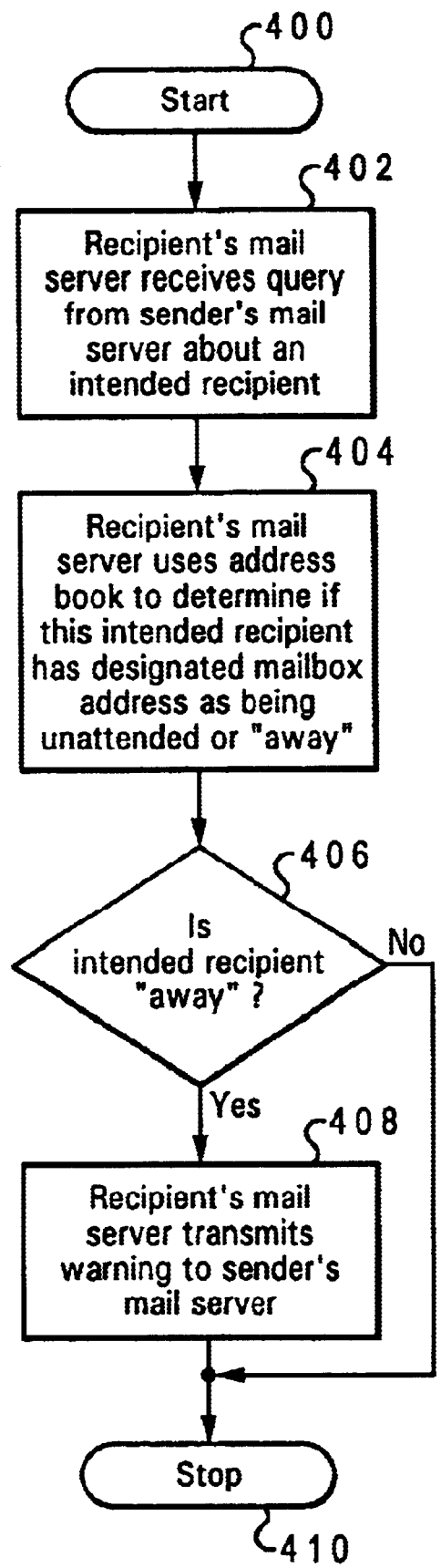
FIG. 4 illustrates a high level flow chart which depicts an electronic mail computer server transmitting warnings for recipients which have designated their electronic address as being unattended in accordance with the present invention.

FIG. 4 illustrates a high level flow chart which depicts an electronic mail computer server transmitting warnings for recipients which have designated their electronic address as being unattended in accordance with the present invention. The process starts as depicted by block 400 and thereafter passes to block 402 which illustrates the recipient's mail server 20 receiving a query from a sender's mail server 18 about the intended recipient of electronic mail. The query identifies the intended recipient. Next, block 404 depicts mail server utilizing the address book within mail server 20 to determine whether the identified intended recipient's mailbox address has been designated as being unattended, or "away". Those skilled in the art will recognize that the recipient's mailbox may be located within mail server 20.

Thereafter, block 406 illustrates a determination of whether or not the intended recipient's electronic mail address is designated as being unattended. If a determination is made that the electronic mail address for the intended recipient is not designated as being unattended, the process terminates as illustrated by block 410. Referring again to block 406, if a determination is made that the electronic mail address for the intended recipient is designated as being unattended, the process passes to block 408 which depicts mail server 20 transmitting a warning to the mail server 18. The process then terminates as illustrated by block 410.

Figure 5:
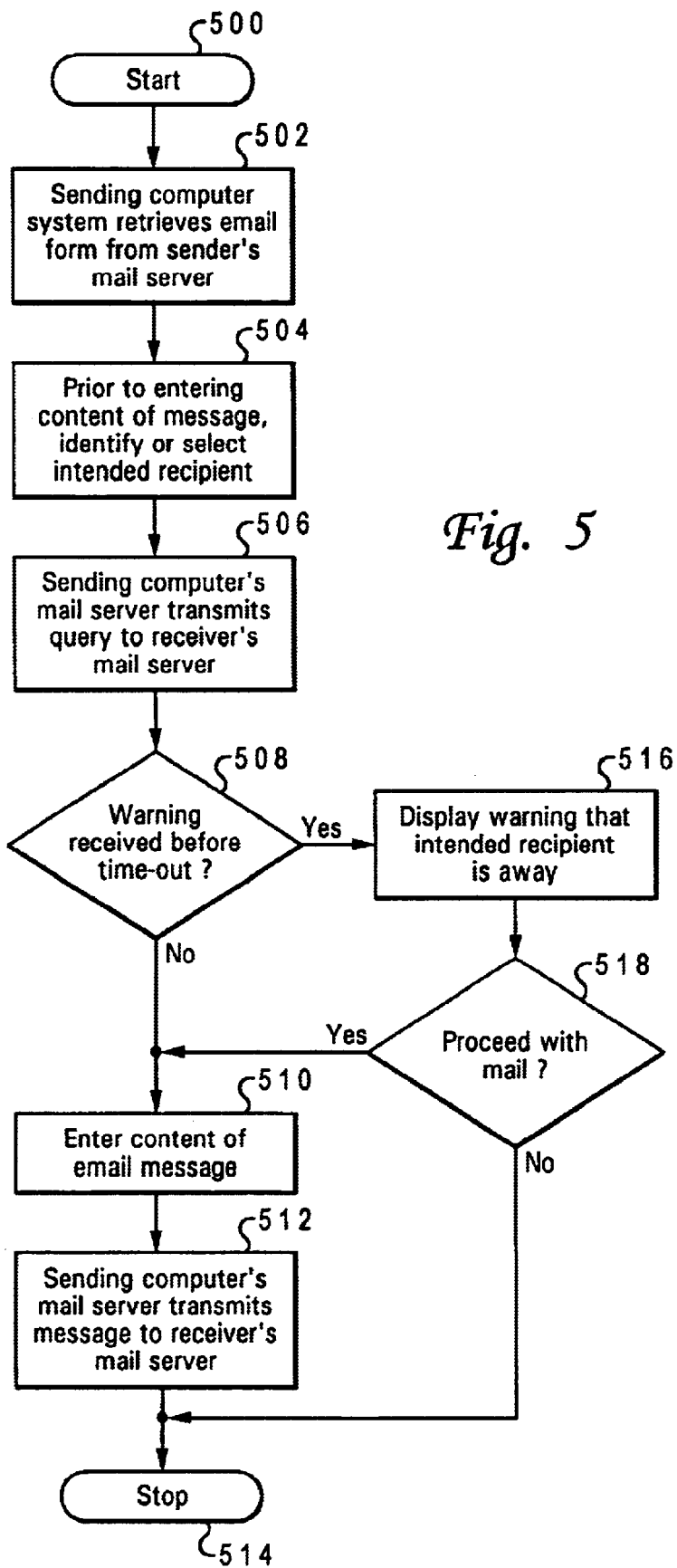
FIG. 5 depicts a high level flow chart which illustrates a sender of electronic mail receiving a warning that an intended recipient's electronic address is designated as being unattended prior to the sender entering the content of the electronic mail message in accordance with the present invention.

FIG. 5 depicts a high level flow chart which illustrates a sender of electronic mail receiving a warning that an intended recipient's electronic address is designated as being unattended prior to the sender entering the content of the electronic mail message in accordance with the present invention. The process starts as depicted by block 500 and thereafter passes to block 502 which illustrates the sender retrieving an electronic mail form from mail server 18 to complete in order to transmit an electronic mail message to an intended recipient. Next, block 504 depicts the sender identifying or selecting an intended recipient for this electronic mail message. The identification or selection is completed prior to entering the content of the message. Thereafter, block 506 illustrates the sender's mail server 18 transmitting a query to the recipient's mail server 20. The query includes the identification of the intended recipient. The query is transmitted upon an entry of an input event, such as a carriage return (CR). The input event is entered after a recipient's name is either typed in or selected.

The process then passes to block 508 which depicts a determination of whether or not the sender's computer received a warning from the mail computer server within a predetermined "time-out" period. A "time-out" period is needed so that the sending computer system does not wait indefinitely for a response from the recipient's mail server. If a determination is made that the sender's computer has not received a warning before the expiration of the "time-out" period, the process passes to block 510 which illustrates the sender proceeding normally with the electronic mail message by entering in the main content of the message. Those skilled in the art will recognize that the content of the message may be an original message created by the sender as either a new message or a reply to a previous message, or it may be a forwarded message. Thereafter, block 512 depicts the sending of the message from mail server 18 to mail server 20. The process then terminates as illustrated by block 514.

Referring again to block 508, if a determination is made that the sender's computer has received a warning before the expiration of the "time-out" period, the process passes to block 516 which illustrates the sender's computer displaying a warning that the intended recipient's electronic mail address is unattended, i.e. the intended recipient is currently away. The content of the "away" message may also be included in addition to the warning that the recipient is away. For example, the content of the "away" message may include a date and/or time when the recipient expects to return. The process then passes to block 518 which depicts a determination of whether or not the sender wishes to proceed with the electronic mail message even though the intended recipient is currently away. If a determination is made that the sender does wish to proceed with the electronic mail message, the process passes to block 510 which illustrates the sender entering the main content of the message. Referring again to block 518, if a determination is made that the sender does not wish to proceed with the email message, the process terminates as depicted by block 514.

While the invention has been particularly shown and described with reference to a preferred embodiment, it will be understood by those skilled in the art that various changes in form and detail may be made therein without departing from the spirit and scope of the invention.

What is claimed is:

1. A method, in a data processing system, comprising:
receiving, from a sender desiring to send an email message, prior to receiving an indication to send the email message, an indication of an intended recipient from within a designated form for the email message;
determining, in response to the received indication, whether a mailbox for said intended recipient is designated as being currently unattended; and
informing the sender, prior to receiving the indication to send the email message, if the mailbox for the intended recipient is designated as being currently unattended.

2. The method of claim 1 wherein the step of receiving an indication of an intended recipient of the email message prior to receiving an indication to send the email message further comprises receiving the indication of the intended recipient prior to the sender creating a body of the message.

3. The method of claim 1 wherein the step of informing further comprises informing the sender of a content of an away message by the intended recipient.

4. The method of claim 1 wherein the step of informing further comprises informing the sender of a date of return of the intended recipient.

5. The method of claim 1 wherein the step of receiving an indication of an intended recipient further comprises receiving the indication in response to a name entered in an addressee field of the designated email form and entered as input through an enter key.

6. The method of claim 1 wherein the step of receiving an indication of an intended recipient further comprises receiving the indication in response to a name entered in an addressee field of the designated email form and entered as input through a mouse click.

7. A method, in a data processing system, comprising:
filling in a name of an intended recipient in an addressee field in a designated form for sending email;
entering the name as input;
receiving information, prior to sending the email, if a mailbox of the intended recipient is currently unattended.

8. The method of claim 7 wherein the step of receiving information prior to sending the email further comprises receiving the information prior to creating a body of the message.

9. A data processing system comprising:
means for receiving, from a sender desiring to send an email message, prior to receiving an indication to send the email message, an indication of an intended recipient from within a designated form for the email message;
means for determining, in response to the received indication, whether a mailbox for said intended recipient is designated as being currently unattended; and
means for informing the sender, prior to receiving the indication to send the email message, if the mailbox for the intended recipient is designated as being currently unattended.

10. The system of claim 9 wherein the means for informing further comprises means for informing the sender of a content of an away message by the intended recipient.

11. The system of claim 9 wherein the means for informing further comprises means for informing the sender of a date of return of the intended recipient.

12. The system of claim 9 wherein the means for receiving an indication of an intended recipient further comprises means for receiving the indication in response to a name entered in an address field of the designated email form and entered as input through an enter key.

13. The system of claim 9 wherein the means for receiving an indication of an intended recipient further comprises means for receiving the indication in response to a name entered in an addressee field of the designated email form and entered as input through a mouse click.

14. A data processing system comprising:
   means for filling in a name of an intended recipient in an addressee field in a designated form for sending email;
   means for entering the name as input;
   means for receiving information, prior to sending the email, if a mailbox of the intended recipient is currently unattended.

15. The system of claim 14 wherein the information is received prior to a body field of the form being entered.

16. The system of claim 14 wherein the information comprises a content of an away message of the intended recipient.

17. The system of claim 14 wherein the information comprises a date of return of the intended recipient.

18. The system of claim 14 wherein the means for entering the name as input is through an enter key.

19. The system of claim 14 wherein the means for entering the name as input is through a mouse click.

20. The system of claim 14 wherein the means for entering the name as input is through a tab key.

21. A computer program, on a computer usable medium, comprising:
   means enabling receipt of, from a sender desiring to send an email message, prior to receiving an indication to send the email message, an indication of an intended recipient from within a designated form for the email message;
   means for enabling a determination of, in response to the received indication, whether a mailbox for said intended recipient is designated as being currently unattended; and
   means for enabling the sender to be informed, prior to receiving the indication to send the email message, if the mailbox for the intended recipient is designated as being currently unattended.

22. A computer program, on a computer usable medium, comprising:
   means for filling in a name of an intended recipient in an addressee field in a designated form for sending email;
   means for enabling an entering of the name as input, independently of enabling a sending of the email;
   means for enabling receipt of information, prior to sending the email, if a mailbox of the intended recipient is currently unattended.

23. A method, in a data processing system, comprising:
   receiving, from a sender desiring to send an email message, prior to receiving an indication to send the email message, an indication of a plurality of intended recipients from within a designated form for the email message;
   determining, in response to the received indication, whether a separate mailbox for each of said intended recipients is designated as being currently unattended; and
   informing the sender, prior to receiving the indication to send the email message, of each mailbox that is designated as being currently unattended.

24. A data processing system comprising:
   means for receiving, from a sender desiring to send an email message, prior to receiving an indication to send the email message, an indication of a plurality of intended recipients from within a designated form for the email message;
   means for determining, in response to the received indication, whether a separate mailbox for each of said intended recipients is designated as being currently unattended; and
   means for informing the sender, prior to receiving the indication to send the email message, of each mailbox that is designated as being currently unattended.

25. A computer program, on a computer usable medium, comprising:
   means enabling receipt of, from a sender desiring to send an email message, prior to receiving an indication to send the email message, an indication of a plurality of intended recipients from within a designated form for the email message;
   means for enabling a determination of, in response to the received indication, whether a separate mailbox for each of said intended recipients is designated as being currently unattended; and
   means for enabling the sender to be informed, before receiving the indication to send the email message, of each mailbox that is designated as being currently unattended.

* * * * *